United States Patent
Benhase et al.

(10) Patent No.: US 9,201,598 B2
(45) Date of Patent: Dec. 1, 2015

(54) APPARATUS AND METHOD FOR SHARING RESOURCES BETWEEN STORAGE DEVICES

(75) Inventors: Michael T. Benhase, Tucson, AZ (US);
Matthew J. Kalos, Tucson, AZ (US);
Karl A. Nielsen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 13/620,061

(22) Filed: Sep. 14, 2012

(65) Prior Publication Data

US 2014/0082318 A1     Mar. 20, 2014

(51) Int. Cl.
*G06F 3/06* (2006.01)
*G06F 9/50* (2006.01)
*G06F 13/20* (2006.01)

(52) U.S. Cl.
CPC ............ *G06F 3/0611* (2013.01); *G06F 3/0631* (2013.01); *G06F 3/0685* (2013.01); *G06F 9/5011* (2013.01); *G06F 13/20* (2013.01); *G06F 2213/0024* (2013.01)

(58) Field of Classification Search
CPC ....................... G06F 9/5044; G06F 2212/7202
See application file for complete search history.

(56) References Cited

U.S. PATENT DOCUMENTS

| | | | |
|---|---|---|---|
| 5,758,050 A * | 5/1998 | Brady et al. | 714/1 |
| 6,212,587 B1 * | 4/2001 | Emerson et al. | 710/107 |
| 8,924,681 B1 * | 12/2014 | Throop et al. | 711/170 |
| 8,935,493 B1 * | 1/2015 | Dolan et al. | 711/161 |
| 8,984,221 B2 * | 3/2015 | Satoyama et al. | 711/114 |
| 2002/0002646 A1 | 1/2002 | Jeddeloh | |
| 2003/0149835 A1 * | 8/2003 | Allen et al. | 711/112 |
| 2004/0255026 A1 * | 12/2004 | Blount et al. | 709/226 |
| 2007/0168634 A1 * | 7/2007 | Morishita et al. | 711/170 |
| 2008/0295097 A1 | 11/2008 | Kocev | |
| 2009/0235269 A1 * | 9/2009 | Nakajima et al. | 718/104 |
| 2011/0264868 A1 * | 10/2011 | Takata et al. | 711/154 |

* cited by examiner

*Primary Examiner* — Nathan Sadler
(74) *Attorney, Agent, or Firm* — Dale F. Regelman; Quarles & Brady LLP (57) ABSTRACT

A method for allocating resources of a storage system including at least a first and second group of storage devices. The method identifies a first set of resources to be reserved for use by the first group of storage devices, identifies a second set of resources to be reserved for use by the second group of storage devices, and identifies a third set of resources The method then allocates resources from the third set of resources to the first group of storage devices or the second group of storage device according to an allocation algorithm, and restricts use of the first set of resources to the first group of devices and use of the second set of resources to the second group of devices.

12 Claims, 5 Drawing Sheets

APPARATUS AND METHOD FOR SHARING RESOURCES BETWEEN STORAGE DEVICES

FIELD OF THE INVENTION

The invention relates to an apparatus and method to manage device performance in a storage system. In certain embodiments, the invention is directed to allocating available resources amongst a number of storage devices in a storage system.

BACKGROUND OF THE INVENTION

Data storage systems are used to store large amounts of information received from one or more sources. A data storage system often comprises a storage controller in communication with one or more clients, often referred to as "hosts," and also in communication with a plurality of data storage devices. A host computing device may send a storage controller a write command to write certain information to a data storage medium, and/or a read command to read information from a data storage medium, and/or a copy command to copy information from one data storage medium to another data storage medium. Host computers may also provide commands to a storage controller to establish or revise physical and/or logical configurations. In certain embodiments, a read command, or a write command, or a copy command, or a configuration command comprises a plurality of objects packaged in one command Many storage systems include a number of different storage devices, each arranged in a number of tiers. The storage devices and associated tiers are arranged to provide different performance characteristics. For example, a high performance tier of a particular storage system may include a number of solid state disks (SSDs) that provide short seek times. Because SSDs can be relatively expensive, the storage system may also include a lower performance tier made up of a number of slower devices, such as Serial Advanced Technology Attachment (SATA) drives. Although the SATA drives provide higher seek times, they can be a more inexpensive way to store data than additional SSD drives.

Within a storage system, the storage devices are connected to the storage system controller through a number of interfaces and each share a limited number of resources. The available resources are distributed amongst the connected storage devices in a first-come, first-served basis. For example, a controller within a storage system may be connected to both SSDs and spinning disks, where the available resources are allocated to each storage device upon request. Once allocated, the resources stay allocated (and unavailable to other devices) until the requesting device completes its task. Because spinning disk devices are slower than the SSDs, resources allocated to those storage devices will stay allocated for a longer time period than for higher performance devices. Accordingly, if both types of devices share the same pool of resources, eventually the slower devices will consume all of the resources. As a result, the performance of the faster (SSD) devices is limited to the actual performance of the slower (spinning disk) devices.

SUMMARY OF THE INVENTION

A method is presented for allocating resources of a storage system including at least a first and second group of storage devices. The method identifies a first set of resources to be reserved for use by the first group of storage devices, identifies a second set of resources to be reserved for use by the second group of storage devices, and identifies a third set of resources The method then allocates resources from the third set of resources to the first group of storage devices or the second group of storage device according to an allocation algorithm, and restricts use of the first set of resources to the first group of devices and use of the second set of resources to the second group of devices.

An article of manufacture is presented, where the article of manufacture comprises a storage management application and a non-transitory computer readable medium comprising computer readable program code disposed therein to allocate resources of a remote storage system comprising at least a first and second group of storage devices, wherein the article of manufacture is in communication with the storage controller.

The article of manufacture identifies a first set of resources to be reserved for use by the first group of storage devices, identifies a second set of resources to be reserved for use by the second group of storage devices, and identifies a third set of resources The article of manufacture then allocates resources from the third set of resources to the first group of storage devices or the second group of storage device according to an allocation algorithm, and restricts use of the first set of resources to the first group of devices and use of the second set of resources to the second group of devices.

A computer program product encoded in a non-transitory computer readable medium is presented.

Using the computer program product, a programmable processor identifies a first set of resources to be reserved for use by the first group of storage devices, identifies a second set of resources to be reserved for use by the second group of storage devices, and identifies a third set of resources The a programmable processor then allocates resources from the third set of resources to the first group of storage devices or the second group of storage device according to an allocation algorithm, and restricts use of the first set of resources to the first group of devices and use of the second set of resources to the second group of devices.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 4:
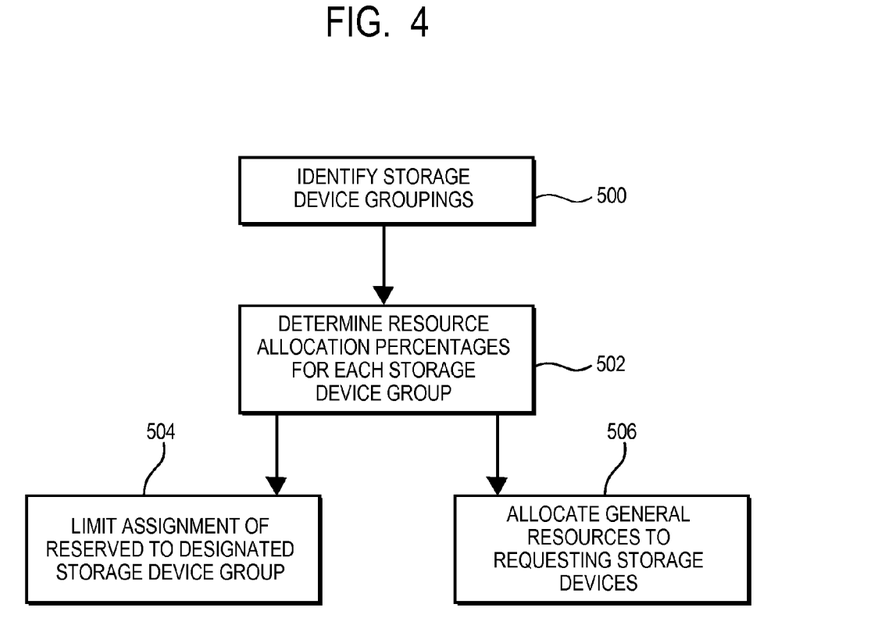
FIG. 4 is a flow chart summarizing certain steps in Applicants' method.

The schematic flow chart diagram included are generally set forth as logical flowchart diagrams (e.g., FIG. 4). As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method (e.g., FIG. 4). Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
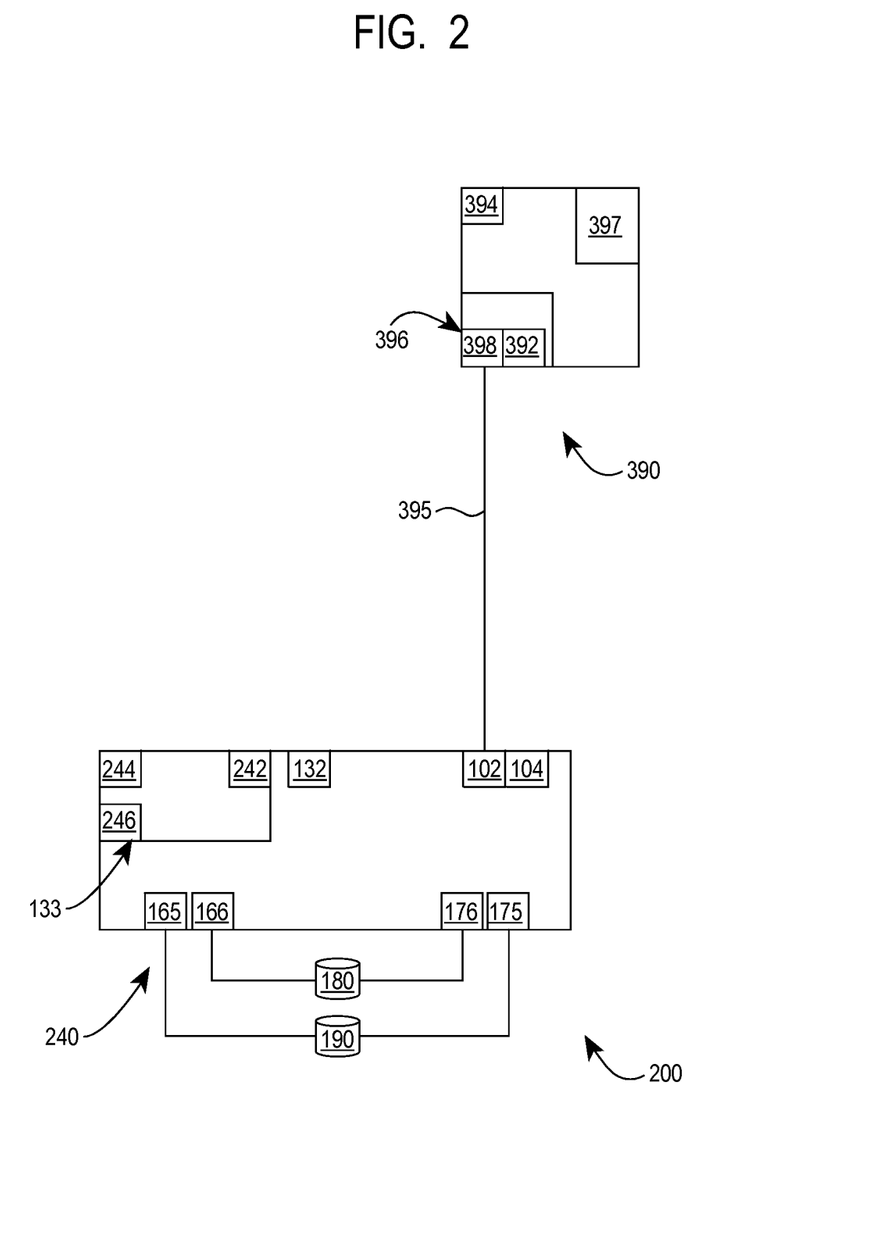
FIG. 2 is a block diagram showing a host computer in communication with a storage controller.

Referring to FIG. 2, data storage system 200 includes storage controller 240 which interconnects a plurality of data storage drives 180 and/or a plurality of data storage drives 190, with a computing device 390. Storage controller 240 comprises a processor 132 and computer readable memory 133, instructions 242 written to computer readable memory 133, a plurality of supported, i.e. enabled, commands 244 written to computer readable memory 133, and a plurality of supported, i.e. enabled, command parameters 246 written to computer readable memory.

In certain embodiments, storage controller 240 communicates with the plurality of data storage devices 180 via device adapters 165 and 175, and with plurality of data storage devices 190 via device adapters 166 and 176, using an I/O protocol such as SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, or SATA (Serial ATA).

In the illustrated embodiments of FIG. 2, computing device 390 comprises a processor 394 and computer readable medium 396, wherein instructions 398 are encoded in computer readable medium 396. In the illustrated embodiments of FIG. 2, computing device 390 further comprises application 397. In certain embodiments, application 397 comprises a storage management program to manage the transfer of data to and from a data storage controller. In certain embodiments, that storage management program may include the functionality of the IBM DFSMS implemented in the IBM zOS operating system.

In certain embodiments, computing device 390 comprises a host computer, wherein that host computer generates data, and provides that data to storage controller 240. Storage controller 240 writes that data to one or more of a plurality of data storage devices 180 and/or 190. Further in the illustrated embodiment of FIG. 2, storage controller 240 is in communication with one host computer 390. In other embodiments, storage controller 240 is in communication with a plurality of host computers. As a general matter, hosts computers 390 includes a computing device, such as a mainframe, personal computer, workstation, and combinations thereof, including an operating system such as Windows, AIX, Unix, zOS, LINUX, etc.

Figure 3:
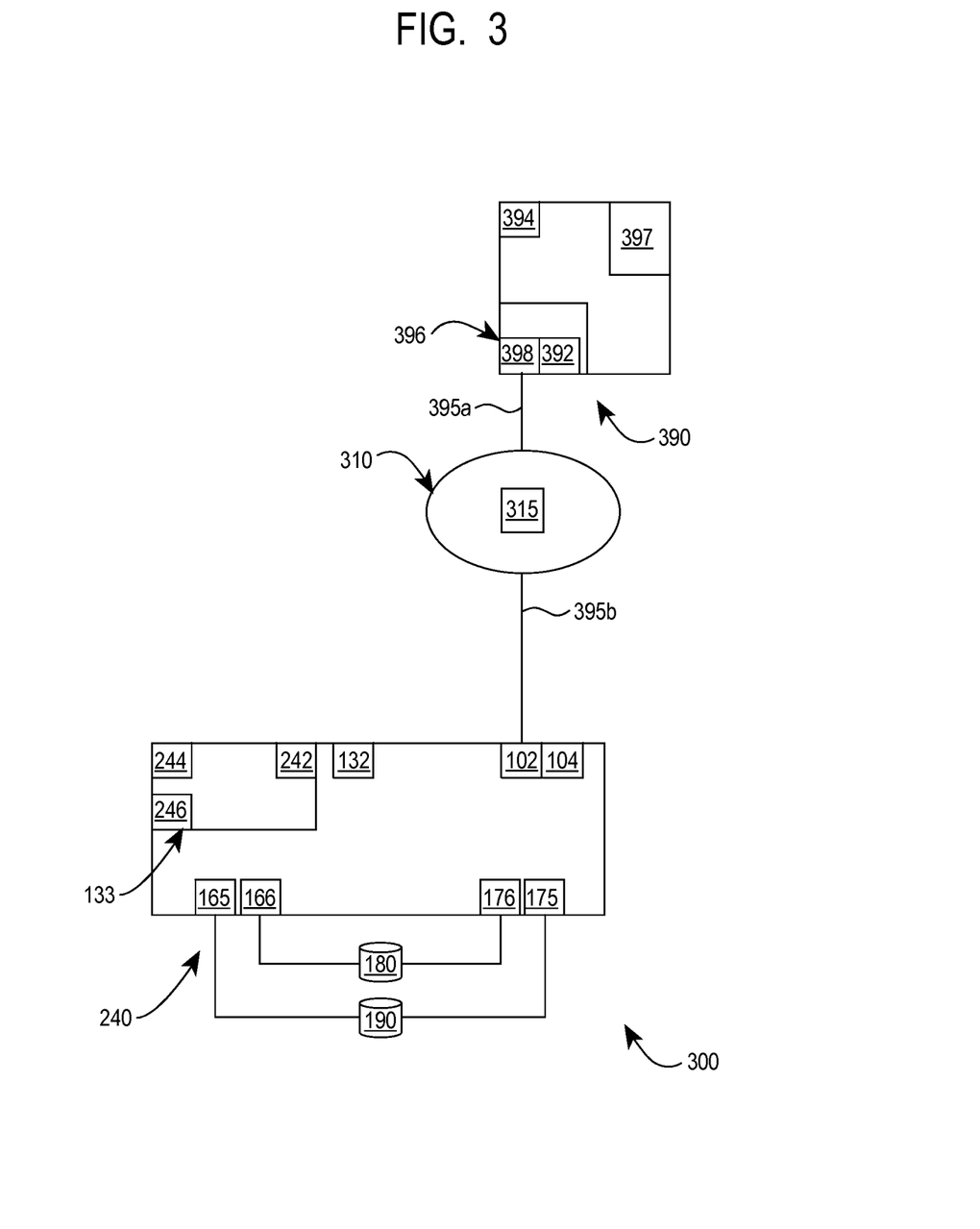
FIG. 3 is a block diagram showing a host computer and a storage controller communicating with one another via a fabric.

FIG. 3 shows the host computer and storage controller of FIG. 2 where host computer 390 and storage controller 240 communicate with one another via fabric 310. In certain embodiments, fabric 310 includes, for example, one or more Fibre Channel ("FC") switches 315. In certain embodiments, those one or more switches 315 include one or more conventional router switches. In the illustrated embodiment of FIG. 3, one or more switches 315 interconnect host computer 390 to storage controller 240 via communication paths 395a and 395b using any type of I/O interface, for example, FC, Infiniband, Gigabit Ethernet, Ethernet, TCP/IP, iSCSI, SCSI I/O interface, or one or more signal lines used by FC switch 315 to transfer information through, to, and from storage controller 240, and subsequently the plurality of data storage devices 180 and/or 190.

In the illustrated embodiments of FIGS. 2 and 3, host computer 390 is interconnected to host adapter 102 disposed in storage controller 240 via communication link 395. The illustrated embodiment of FIG. 2 shows host computer 390 interconnected with storage controller 240 via one communication link. The illustrated embodiment of FIG. 3 shows host computer 390 interconnected with fabric 310 via one communication link. In other embodiments, host computer 390 is interconnected with storage controller 240/fabric 310 with more than one communication link. In certain embodiments, communication link 395 may be configured to comprise up to 256 logical communication paths.

Figure 1:
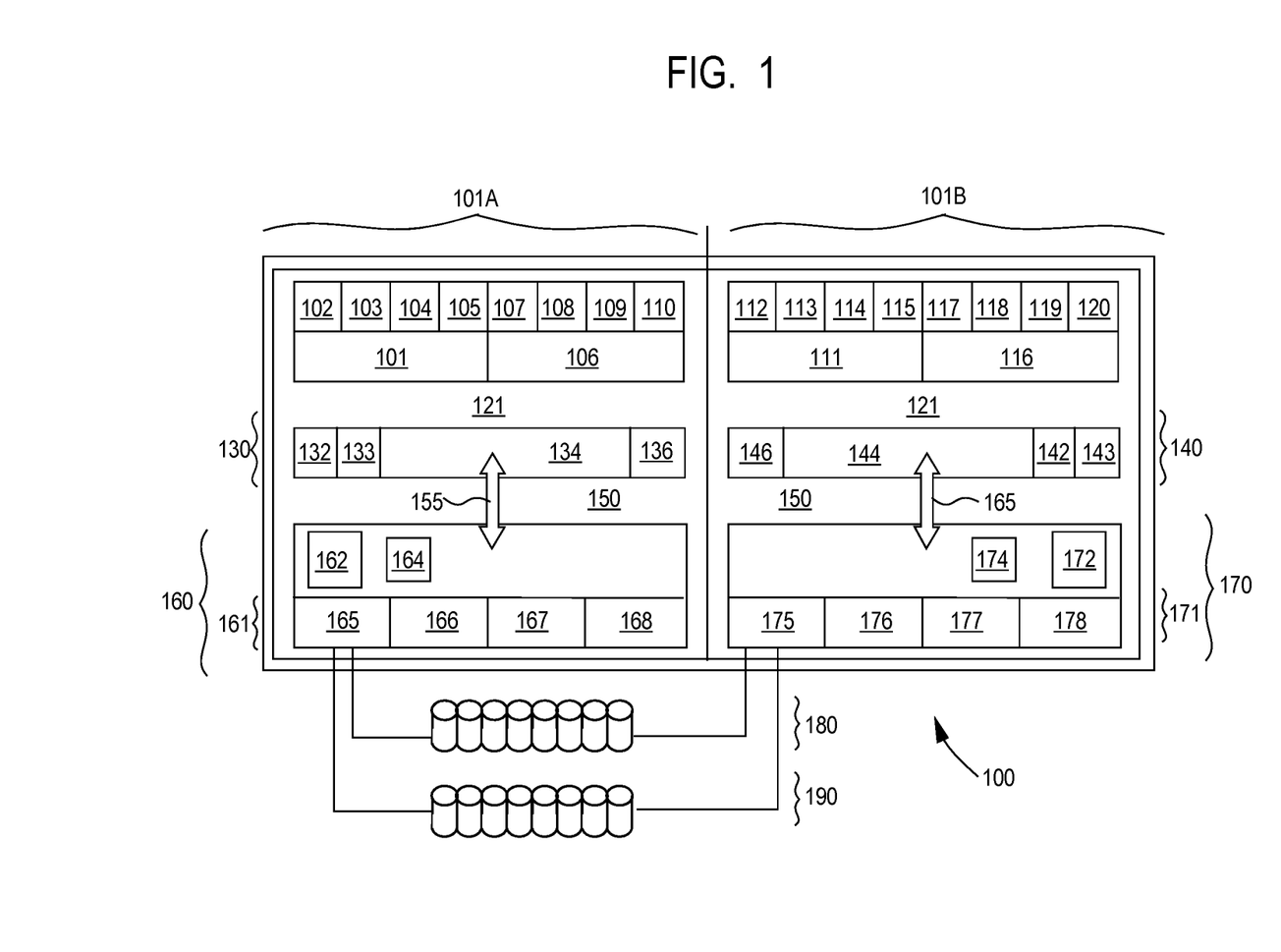
FIG. 1 is a block diagram showing one embodiment of Applicants' storage controller.

Referring now to FIG. 1, in certain embodiments, storage controller 240 comprises a data storage library, such as for example and without limitation, data storage library 100. In certain implementations, data storage library 100 includes a first cluster 101A and a second cluster 101B, wherein clusters 101A and 101B are disposed in the same housing. In the illustrated implementation of FIG. 1, data storage library 100 includes a plurality of host adapters 102-105, 107-110, 112-115, and 117-120, disposed in four host bays 101, 106, 111, and 116. In other implementations, data storage system includes fewer than 16 host adapters. Regardless of the number of host adapters disposed in any implementations of the system, each of those host adapters includes a shared resource that have equal access to both central processing/cache elements 130 and 140.

Each host adapter may comprise any kind of I/O interface. Each host adapter is connected to both clusters 101A and 101B through interconnect bus 121 such that each cluster can handle I/O from any host adapter, and such that the storage controller portion of either cluster can monitor the communication path error rate for every communication path, physical and/or logical, interconnected with data storage library 100.

Storage controller portion 130 includes processor 132, computer readable medium 133, cache 134, and nonvolatile storage ("NVS") 136. In certain implementations, computer readable medium 133 includes random access memory. In certain implementations, computer readable medium 133 includes non-volatile memory.

Storage controller portion 140 includes processor 142, computer readable medium 143, cache 144, and NVS 146. In certain embodiments, computer readable medium 143 includes random access memory. In certain embodiments, computer readable medium includes non-volatile memory.

I/O portion 160 includes a plurality of device adapters, such as device adapters 165, 166, 167, and 168. I/O portion 170 further includes a plurality of device adapters, such as device adapters 175, 176, 177, and 178.

In certain embodiments of the system, one or more host adapters, storage controller portion 130, and one or more device adapters, are packaged together on a single card disposed in the data storage system. Similarly, in certain embodiments, one or more host adapters, storage controller portion 140, and one or more device adapters, are disposed on another card disposed in the data storage system. In these embodiments, system 100 includes two cards interconnected with a plurality of data storage devices.

In the illustrated embodiment of FIG. 1, sixteen data storage devices are organized into two arrays. In other embodiments, the data storage system includes more than two storage device arrays. In certain embodiments, each storage array appears to a host computer as one or more logical devices.

In certain embodiments, arrays 180 and/or 190 utilize a RAID (Redundant Array of Independent Disks) protocol. In certain embodiments, arrays 180 and/or 190 include what is sometimes called a JBOD array, i.e. "Just a Bunch Of Disks" where the array is not configured according to RAID. As those skilled in the art will appreciate, a RAID rank includes independent disk drives configured in an array of disk drives to obtain performance, capacity and/or reliability that exceeds that of a single large drive.

Arrays 180 and/or 190 (and any other attached arrays of storage devices) may provide different tiers of storage devices within the data storage system. Depending upon the particular storage devices incorporated into an array and their particular configuration, the different tiers of a data storage system can provide varying performance characteristics. One tier, for example, may be a high-performance tier providing fast seek times and large bandwidth, but only limited storage capacity. A second tier may provide lower performance, due to its use of slower storage devices, but increased storage capacity.

In one typical storage system implementation, a first high-performance tier may include an array of SSDs. SSDs are relatively high performance storage devices providing high performance for random input/output operations. Due to their expense, though, the first tier may not provide a large storage capacity. To compensate, the storage system may include a second lower performance tier including an array of spinning-disk drives (e.g., SATA drives) that, while slower than SSDs, provide a larger storage capacity. These disks could be arranged into a RAID array, for example. Some storage systems include a third tier comprising an array of tape drive devices that provide substantial storage capacity, but relatively slow performance. In some cases, storage systems may also include an enterprise tier. In general, storage systems can include many different combinations of tiers, with each tier including different types of storage devices.

The various storage devices in each tier are connected to the storage system controller through a number of interfaces or device adapters. The interfaces (and connected storage devices) each share a fixed number of resources. In conventional storage systems, the available resources are distributed amongst the connected storage devices in a first-come, first-served basis. In such an arrangement, the storage system's slower storage devices will eventually consume all of the available resources greatly reducing the performance of the faster storage devices.

Some storage systems attempt to mitigate this problem by allocating separate pools of resources to different types of storage devices. In that case, though, when one device type is idle (and not using its resources), those resources are unavailable to other device types, which may be very busy. Accordingly, the resources allocated to the idle storage device type cannot be used by the busier storage devices. Again, this reduces the potential performance of the storage system.

In the present system, the storage system controller has a single pool of resources that are made available to the various connected storage devices. The storage devices are assigned into different groups, and the controller dynamically adjusts how many of the available resources can be allocated to each group of connected storage devices. Storage devices may be categorized based upon the storage class of the device. Example classes include SSD, Enterprise, Nearline (SATA), tape, etc. In some situations sub-categories may be used to further categorize the storage devices, where the subclass is based upon other performance characteristics, such as the RPM of a disk drive. For example, most Enterprise class drives are either 10 k or 15 k RPM devices and may placed into particular classes or subclasses accordingly. In some cases, the storage class may be more important than the subclass (e.g., RPM). For example, most Nearline drives run at 7.2 k RPM. Some Nearline drives run at 10 k RPM, but may be placed into the same class as the 7.2 k RPM drives.

During operation of the storage system, if one category or group of storage devices is very busy, while the remaining storage devices are idle, a majority of the available resources are allocated to the busy storage device category on a first-come, first-served basis (or using any other appropriate resource allocation method). However, a relatively small number of resources are reserved for the idle storage device category so that if those storage devices require access to resources, resources are readily available for allocation to those storage devices.

When all groups of storage devices are busy, the resources are allocated between the storage device categories in order to allow each category to operate as efficiently as possible. In one embodiment, the number of resources that a given group of storage devices can use is increased. For example, if idle groups only hold on to 5% of the resources, an active group could hold onto 20% of the resources (or more). As such, if both groups are active, neither group can take more than 80% of the resources. These percentages are only examples and may be adjusted based upon a particular system implementation. Alternatively, dynamic algorithms may be used to efficiently allocate resources amongst different groups of storage devices. The algorithms can monitor how deep the queue of waiting requests gets for a group of devices (e.g., a group of faster devices). If the queue is getting too long for that group, that group could reserve a higher percentage of resources. To be effective, the queue depth can be measured based upon how long jobs have been waiting rather than the number of items in the queue because the faster devices may go through more requests in a given amount of time than slower devices.

The present system may operate with multiple groups or categories of storage device. Within a particular category of storage device, the available resources can be allocated in a first-come, first-served basis.

The following examples are presented to further illustrate to persons skilled in the art how to make and use the invention.

These examples are not intended as a limitation, however, upon the scope of the invention.

Example I

In this example use of the present system, a storage system includes two groups of storage devices—the first group includes an array of high-performance SSDs and the second group includes an array of lower-performance spinning disk (e.g., SATA) drives. At initiation of the storage system, both device types can be allocated up to 90% of the storage system's available resources. If one device type goes idle however, the active device type will be limited to 90% of the available resources leaving 10% of the resources available for the idle category of storage device. Accordingly, the controller reserves 10% of the available resources for each group of storage devices. That 10% of resources can be made readily available to an idle category of storage devices in the event that any of those storage devices should start being used and request resources.

Example II

In another example, if a given storage device group is being used, the other device category will not be allowed to allocate more than 80% of the resources, for example. That makes it so that either group of storage devices will always be able to be allocated up to 20% of the resources.

Example III

Table 1 recites Allocation Schemes A, B, C, and D. In Allocation Scheme A, 90 percent of available storage controller resources are allocated to a SSD grouping of storage devices, and 10 percent of available storage controller resources are allocated to a "spinning disk,", i.e. SATA and/or Enterprise magnetic hard drives, grouping of storage devices. In certain embodiments, Allocation A is employed when the spinning disks are idle.

Allocation Scheme B allocates 80 percent of available storage controller resources to a SSD grouping of storage devices, and 20 percent of available storage controller resources are allocated to a "spinning disk" grouping of storage devices. In certain embodiments, Allocation Scheme B is employed when the storage controller is using SSD drives for a majority of input/output ("I/O") requests, where that majority of I/O requests comprise relatively small files.

Allocation Scheme C allocates 50 percent of available storage controller resources to a SSD grouping of storage devices, and 50 percent of available storage controller resources are allocated to a "spinning disk" grouping of storage devices. In certain embodiments, Allocation Scheme C is employed when the storage controller is handling about an equal number of I/O requests directed to relatively small files and relatively large files.

Allocation Scheme D allocates 30 percent of available storage controller resources to a SSD grouping of storage devices, and 70 percent of available storage controller resources are allocated to a "spinning disk" grouping of storage devices. In certain embodiments, Allocation Scheme D is employed when the storage controller is handling a few I/O requests directed to relatively small files and many more I/O requests directed to relatively large files.

TABLE 1

| ALLOCATION SCHEME | SSD TIER | SPINNING DISK TIER |
| --- | --- | --- |
| A | 90 | 10 |
| B | 80 | 20 |
| C | 50 | 50 |
| D | 30 | 70 |

The present system for allocating resources amongst storage devices can be implemented by the controller of a storage system. For example, the present system may be implemented as a method implemented by processor 132 of storage controller 240 shown in FIG. 2. The method may be embodied as programmatic instructions stored in a computer readable memory, such as memory 133 also shown in FIG. 2.

FIG. 4 is a flowchart depicting a method for allocating resources to storage devices in accordance with the present disclosure. The method may implemented by a processor of a storage controller, where the storage controller is in communication with a number of attached storage devices.

In step 500 Applicants' apparatus and method detect a number of attached storage devices and identifies a grouping for each storage device.

In certain embodiments, step 500 is performed by a storage controller, such as storage controller 240. In certain embodiments, step 500 is performed by a processor disposed in a storage controller, such as controller 132 and/or controller 142. In certain embodiments, step 500 is performed by a host computer, such as host computer 390. In certain embodiments, step 500 is performed by a storage management application encoded in a host computer, such as application 397.

The storage devices may include a number of different types of devices (e.g., SSDs, SATA drives, enterprise disks, other spinning-disk storage devices, tape drives, etc.) that are connected to the controller through a number of different device adapters.

The device adapters (e.g., adapters 165, 166, 176, and 175 shown in FIG. 2) provide connections (either wired or wireless) between the controller and attached storage devices. The attached storage devices, as discussed above, may be arranged into a number of array or tiers.

After detecting the attached storage devices, Applicants' apparatus and method identifies a grouping for each of the attached storage devices. In one implementation, the storage devices are grouped based upon performance. For example, SSDs may be placed into a first group, spinning disk storage devices into a second group, and tape devices into a third group. In other implementations, the controller samples the actual read/write performance of the attached storage devices and allocates the devices to particular groups based upon the results. In other implementations, though, other attributes of the attached storage devices can be used to allocate the devices to particular groups.

Different categories for the storage devices may be based upon the tier in which a storage device is installed, the communications protocols implemented by the storage devices, the types of device adapters utilized by the storage devices, the makes or models of the storage devices, the types of data stored by the storage devices, etc., and combinations thereof.

After determining a grouping for each attached storage device, Applicants' apparatus and method determine a number or percentage of available resources that are to be allocated to each group of storage devices.

There are a finite number of resources that can be allocated between connected storage devices. For each device adapter pair, for example, there are a fixed number of available command structures (e.g., task control blocks (TCBs)) that can be allocated to each storage device. One adapter pair, for example, may be associated with 500-700 command structures. The command structures are used to instruct a storage device to take a particular action (e.g., write data, read data, or copy data). The command structures themselves can only be assigned within a limited address space (e.g., the PCI address space). Because the number of available command structures and their associated address space is limited, the available resources for communicating with storage devices is correspondingly limited.

In conventional storage systems, the resources are allocated on a first-come, first-served basis. In the present system, however, a number or percentage of the available resources are reserved for each group of storage devices to ensure that resources for that category of storage device are quickly available should a storage device in that category requests resources. The remaining, unreserved resources, however, can be allocated amongst the storage devices on a first-come, first-served basis, or using any other appropriate resource allocation algorithm. In one implementation, the remaining resources are dynamically allocated between groups of storage device to ensure efficient operation of all the storage system's connected storage devices. As between groups of fast storage devices (e.g., SSDs) and slower storage devices (e.g., spinning disk storage devices) the remaining resources may be allocated so that the fast storage devices can consume only 20% of available resources, while the slower storage devices can consume 80% of the resources. Such an allocation can be efficient because the faster storage devices use their allocated resources for a sufficiently short period of time that the faster storage devices can achieve saturated utilization with only 20% of available controller resources. Similarly, the slower storage devices are sufficiently slow that if allocated fewer than 80% of available resources, the slower storage devices would have insufficient resources to efficiently process transactions. As such, this 20/80 allocation of resources between faster and slower groups of storage devices allows for the most efficient operation of both the faster and slower storage devices.

In step 502, therefore, Applicants' apparatus and method determine a number of resources to be reserved for each identified category of storage device as well as a number of resources that are generally assignable between storage device groups. In certain embodiments, step 502 is performed by a storage controller, such as storage controller 240. In certain embodiments, step 502 is performed by a processor disposed in a storage controller, such as controller 132 and/or controller 142. In certain embodiments, step 502 is performed by a host computer, such as host computer 390. In certain embodiments, step 502 is performed by a storage management application encoded in a host computer, such as application 397.

In one implementation, for example, where the controller is connected to a number of storage devices (e.g., SSDs) that are assigned to a first category, and a number of other storage devices (e.g., spinning disks) that are assigned to a second category, the following resource allocation may be utilized. For the devices of the first category, a minimum of 10% of the resources are made available. Similarly, for the devices of the second category, a minimum of 10% of the resources are made available. The remaining resources (i.e., 80% of the available resources) are allocated between the different groups of storage devices on a first-come, first-served basis. In such an arrangement, therefore, if the first category of storage devices is active while the second category is idle, storage devices in the first category may use up to 90% of the available resources (80% of the generally-assignable resources plus the 10% of resources reserved to the first category of storage device), with the remaining 10% of resources being reserved for storage devices of the second category. As such, the active storage devices have a relatively large number of available resources allowing for efficient operation of those devices. Additionally, the second category of storage devices has a small number of resources that are always available. Accordingly, should a storage devices in the second category become active, resources are immediately available for use by those storage devices. If resources were not reserved for the second category, devices in the second category would have to wait until resources are freed up by the storage devices in the first category.

Of course, in other implementations of the present system, a varying percentage of available resources can be allocated amongst a number of different categories of storage devices.

Accordingly, after determining how the resources are going to be allocated amongst the categories of storage device, Applicants' apparatus and method has identified a number of resources that are to be reserved for particular groups of storage devices as well as a remaining number of general resources that can be freely allocated to different storage devices. In step 504, therefore, the controller limits the allocation of reserved resources to storage devices that belong to the group to which the resources are allocated. In certain embodiments, step 504 is performed by a storage controller, such as storage controller 240. In certain embodiments, step 504 is performed by a processor disposed in a storage controller, such as controller 132 and/or controller 142. In certain embodiments, step 504 is performed by a host computer, such as host computer 390. In certain embodiments, step 504 is performed by a storage management application encoded in a host computer, such as application 397.

At the same time, Applicants' apparatus and method can allocate the general resources (not reserved for a particular storage device group) to any requesting storage device in step 506. In certain embodiments, step 506 is performed by a storage controller, such as storage controller 240. In certain embodiments, step 506 is performed by a processor disposed in a storage controller, such as controller 132 and/or controller 142. In certain embodiments, step 506 is performed by a host computer, such as host computer 390. In certain embodiments, step 506 is performed by a storage management application encoded in a host computer, such as application 397.

The allocation of resources in step 506 may be made according to any suitable algorithm. For example, the resources may be allocated on a first-come, first-served basis. Alternatively, the resources allocated in step 506 may be dynamically allocated to optimize a performance of the storage system to ensure that the available general resources are allocated in an efficient manner between storage devices.

Figure 5:
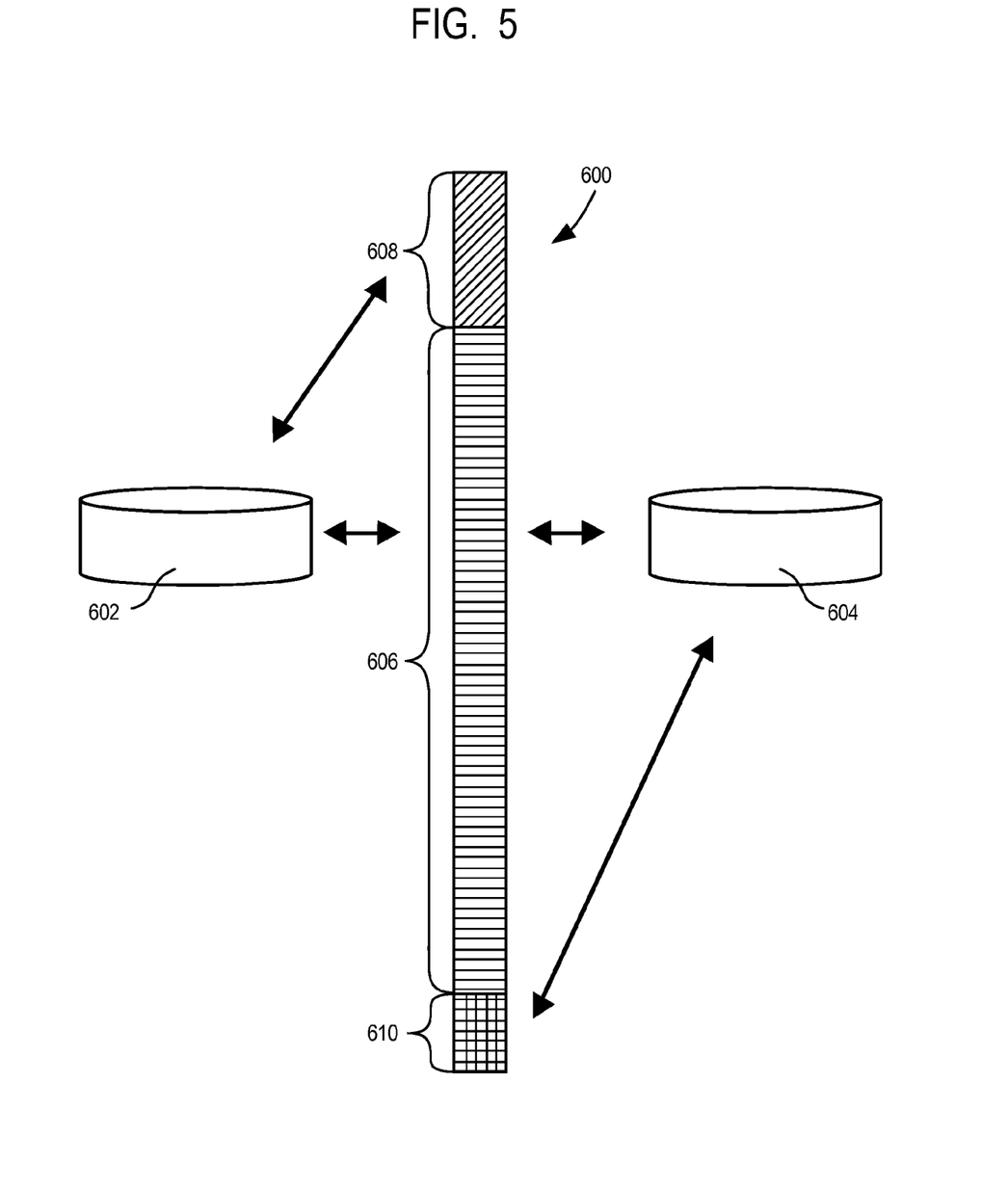
FIG. 5 is an illustration showing how the available resources of a storage system may be allocated between groups of storage devices.

FIG. 5 is an illustration showing how the available resources of a storage system may be allocated between groups of storage devices. As shown in FIG. 5, block 600 represents a number of resources of the storage system that can be allocated to attached storage devices. The resources may include a number of command structures, allocatable address space, other resources, and combinations thereof.

The storage system includes two groups of storage devices 602 and 604. Each group can include any number of storage devices of varying types and having varying performance characteristics, as described above.

The storage device's resource 600 include a number of resources 606 that can be allocated to any storage devices belonging to groups 602 or 604. The resources can be allocated to storage devices of either group according to any appropriate allocation algorithm including, for example, a first-come, first-served basis.

Resources 600 also include a number of resources 608 that are reserved for use by storage devices belonging to group 602. Those resources cannot be allocated to storage devices of group 604 and are always available for use by group 602. Similarly, resources 600 also include a number of resources 610 that are reserved for use by storage devices belonging to group 604. Those resources cannot be allocated to storage devices of group 602 and are always available for use by group 604.

In certain embodiments, individual steps recited in FIG. 4 may be combined, eliminated, or reordered.

In certain embodiments, instructions, such as instructions 398 (FIGS. 2, 3) encoded in computer readable medium 396 (FIGS. 2, 3), wherein those instructions are implemented by a processor, such as processor 394 (FIGS. 2, 3), to perform one or more of steps 500, 502, 504 and/or 506, recited in FIG. 4.

In other embodiments, the invention includes instructions residing in any other computer program product, where those instructions are implemented by a computer external to, or internal to, data storage library 100 (FIG. 3), data storage system 200 (FIG. 2), data storage system 300 (FIG. 3), to perform one or more of steps 500, 502, 504 and/or 506, recited in FIG. 4. In either case, the instructions may be encoded in computer readable medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for allocating resources of a storage system, comprising:
   providing a storage system in communication with a remote host computer comprising a storage management program, wherein said storage system comprises a plurality of attached storage devices;
   sampling an actual read/write performance for each attached storage device;
   based upon said actual sampling, allocating an attached storage device to a first group of storage devices or to a second group of storage devices;
   allocating by said storage management application a number of task control blocks for use by the first group of storage devices;
   allocating by said storage management application PCI address space to said first group of storage devices;
   determining by said storage management application a third set of task control blocks and PCI address space resources that are generally assignable between storage device groups;
   restricting by said storage management application use of the first set of task control blocks and first PCI address space resources to the first group of storage devices and use of a second set of task control blocks and PCI address space resources to a second group of storage devices.

2. The method of claim 1, wherein the first group of storage devices includes a plurality of solid state disks.

3. The method of claim 1, wherein the second group of storage devices includes a plurality of spinning disk drives.

4. The method of claim 1, including dynamically adjusting an allocation of resources from the third set of resources to optimize a performance of the first group of storage devices or the second group of storage devices.

5. A host computer in communication with a remote storage system and comprising a storage management application and a non-transitory computer readable medium comprising computer readable program code disposed therein to allocate resources of said remote storage system, the computer readable program code comprising a series of computer readable program steps to effect:
   sampling an actual read/write performance for each storage device attached to said remote storage system;
   based upon said actual sampling, allocating an attached storage device to a first group of storage devices or to a second group of storage devices;
   allocating by said storage management application a number of task control blocks for use by the first group of storage devices;
   allocating by said storage management application PCI address space to said first group of storage devices;
   determining by said storage management application a set of task control blocks and PCI address space resources that are generally assignable between storage device groups;
   restricting by said storage management application use of the first set of task control blocks and first PCI address space resources to the first group of storage devices and use of a second set of task control blocks and PCI address space resources to a second group of storage devices.

6. The article of claim 5, wherein the first group of storage devices includes a plurality of solid state disks.

7. The article of claim 5, wherein the second group of storage devices includes a plurality of spinning disk drives.

8. The article of claim 5, including computer readable program steps to effect dynamic adjusting an allocation of resources from the third set of resources to optimize a performance of the first group of storage devices or the second group of storage devices.

9. A computer program product encoded in a non-transitory computer readable medium disposed in a host computer comprising a storage management application and useable with said storage management application to allocate resources of a remote storage system comprising a plurality of attached storage devices, comprising:
   computer readable program code which causes said storage management application to sample an actual read/write performance for each attached storage device;
   computer readable program code which causes said storage management application to, based upon said actual sampling, allocate an attached storage device to a first group of storage devices or to a second group of storage devices;
   computer readable program code which causes said storage management application to allocate a number of task control blocks for use by the first group of storage devices;

computer readable program code which causes said storage management application to allocate PCI address space to said first group of storage devices;

computer readable program code which causes said storage management application to determine a third set of task control blocks and PCI address space resources that are generally assignable between storage device groups;

computer readable program code which causes said storage management application to restrict use of the first set of task control blocks and first PCI address space resources to the first group of devices and use of the second set of task control blocks and PCI address space resources to the second group of devices.

10. The computer program product of claim 9, wherein the first group of storage devices includes a plurality of solid state disks.

11. The computer program product of claim 9, wherein the second group of storage devices includes a plurality of spinning disk drives.

12. The computer program product of claim 9, further comprising computer readable program code which causes said storage management application to dynamically adjust an allocation of resources from the third set of resources to optimize a performance of the first group of storage devices or the second group of storage devices.

* * * * *